US007235017B2

(12) United States Patent
Clemm et al.

(10) Patent No.: US 7,235,017 B2
(45) Date of Patent: Jun. 26, 2007

(54) CONSTANT VELOCITY FIXED JOINT HAVING CROSSED RACEWAYS, UNIVERSAL JOINT SHAFT AND METHOD FOR PRODUCING A CONSTANT VELOCITY FIXED JOINT HAVING CROSSED RACEWAYS

(75) Inventors: Oliver Clemm, Hannover (DE); Gregor Schaaf, Braunschweig (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 11/390,562

(22) Filed: Mar. 27, 2006

(65) Prior Publication Data
US 2006/0166748 A1 Jul. 27, 2006

Related U.S. Application Data

(63) Continuation of application No. PCT/EP2004/009742, filed on Sep. 1, 2004.

(30) Foreign Application Priority Data

Sep. 30, 2003 (DE) ............................ 103 45 483
Jun. 28, 2004 (DE) ...................... 10 2004 031 154

(51) Int. Cl.
*F16D 3/223* (2006.01)
(52) U.S. Cl. ........................ 464/144; 464/906
(58) Field of Classification Search ............. 464/144, 464/906
See application file for complete search history.

(56) References Cited

U.S. PATENT DOCUMENTS 2,322,570 A * 6/1943 Dodge ................. 464/144

| 5,647,800 | A | 7/1997 | Warnke et al. |
| 6,497,622 | B1 | 12/2002 | Bilz et al. |
| 2002/0077185 | A1 | 6/2002 | Meyer et al. |
| 2002/0094230 | A1* | 7/2002 | Weckerling et al. |
| 2002/0151369 | A1 | 10/2002 | Miller et al. |
| 2004/0072622 | A1 | 4/2004 | Hassenrik et al. |

FOREIGN PATENT DOCUMENTS

| DE | 42 28 230 A1 | 3/1993 |
| DE | 199 56 672 C1 | 9/2001 |
| GB | 430859 | 6/1935 |
| GB | 637718 | 5/1950 |
| GB | 760681 | 11/1956 |
| GB | 987572 | 3/1965 |

* cited by examiner

*Primary Examiner*—Greg Binda
(74) *Attorney, Agent, or Firm*—Manfred Beck, P.A.

(57) ABSTRACT

A constant velocity fixed joint includes a joint outer part and a joint inner part with crossed ball raceways. The ball raceways of the joint outer and inner parts form ball raceway pairs and balls are disposed in respective ones of the ball raceway pairs. A cage is held in place at one of the joint parts. Windows in the cage receive the balls. One of the joint parts has a cage guiding surface for axially holding the cage in a first direction. A termination element is provided as a separate element at the one of the joint parts. The termination element has a counterface and the cage is held axially in a second direction opposite the first direction by the counterface of the termination element. The cage guiding surface of the joint part has an undercut-free region toward the termination element.

23 Claims, 6 Drawing Sheets

CONSTANT VELOCITY FIXED JOINT HAVING CROSSED RACEWAYS, UNIVERSAL JOINT SHAFT AND METHOD FOR PRODUCING A CONSTANT VELOCITY FIXED JOINT HAVING CROSSED RACEWAYS

CROSS-REFERENCE TO RELATED APPLICATION

This application is a continuation, under 35 U.S.C. § 120, of copending International Application No. PCT/EP2004/009742, filed Sep. 1, 2004, which designated the United States; this application also claims the priority benefits, under 35 U.S.C. § 119, of German Patent Application No. DE 103 45 483.7, filed Sep. 30, 2003 and German Patent Application No. DE 10 2004 031 154.4, filed Jun. 28, 2004; the prior applications are herewith incorporated by reference in their entirety.

BACKGROUND OF THE INVENTION

Field of the Invention

The invention relates to a constant velocity fixed joint having crossed raceways, including a joint outer part and a joint inner part with crossed raceways assigned to one another in pairs, balls, which are disposed in the pairs of raceways, and a cage, which is held at one of the two joint parts and has windows for receiving the balls.

The invention further relates to a universal joint shaft having such a constant velocity fixed joint. The invention further relates to a method of producing such a constant velocity fixed joint.

Constant velocity joints having crossed raceways have been known for quite some time. For example, constant velocity joints with crossed raceways are generally used in motor vehicles as slip joints in universal joint shafts on the transmission side. In vehicles having a rear drive, they are also used on the wheel-side of the drive universal joint shaft.

A fixed joint is created by securing the cage axially either to the joint outer part or to the joint inner part, wherein the fixed joint can be used for bending angles of up to about 25 degrees depending on the layout. The cage is in this case generally guided by a cage guiding surface which ensures a movability with respect to a swivel motion of the joint and at the same time fixes the joint in an axial direction. Such joints are for example disclosed in German Patent No. DE 199 56 672 C1, German Patent Application No. DE 42 28 230 A1 and U.S. Pat. No. 6,497,622 B1.

However, the assembly of such joints is rather complex. It generally it is necessary to mount the cage prior to the balls. After that, the joint inner part and the cage have to be excessively bent with respect to the outer part, i.e. they have to be bent or angled beyond the maximum operating bending angle, in order install the balls into the windows of the cage.

In particular in the case of bell-type joint outer parts which are closed on one side, this mounting concept results in relatively large and thus also heavy configurations, because sufficient space must be provided for the cage that swivels inwards and the balls that run to the bottom of the joint. The raceways of the balls which have to be constructed as correspondingly long raceways require a high outlay for machining.

A further disadvantage of the mounting concept described above, is that it is poorly suited for automation.

SUMMARY OF THE INVENTION

It is accordingly an object of the invention to provide a constant velocity fixed joint which overcomes the above-mentioned disadvantages of the heretofore-known joints of this general type and which improves the manufacturing process of the constant velocity fixed joint. It is a further object of the invention to provide an improved method of manufacturing a constant velocity fixed joint. Another object of the invention is to provide a universal joint shaft.

With the foregoing and other objects in view there is provided, in accordance with the invention, a constant velocity fixed joint including:
  joint parts including a joint outer part and a joint inner part;
  the joint outer part and the joint inner part having crossed ball raceways, the ball raceways of the joint outer part and the ball raceways of the joint inner part being assigned to one another such that the ball raceways form ball raceway pairs;
  balls disposed in respective ones of the ball raceway pairs;
  a cage held in place at one of the joint parts, the cage having windows formed therein for receiving the balls;
  one of the joint parts having a cage guiding surface with a given section, the cage being held axially in a first direction by the given section of the cage guiding surface;
  a termination element provided as a separate element at the one of the joint parts, the termination element having a counterface, the cage being held axially in a second direction opposite the first direction by the counterface of the termination element; and
  the cage guiding surface of the one of the joint parts having an undercut-free region toward the termination element.

In other words, according to the invention, there is provided a constant velocity fixed joint with crossed ball raceways, including:
  a joint outer part and a joint inner part with crossed ball raceways assigned to one another in pairs;
  balls which are disposed in the pairs of ball raceways; and
  a cage which is secured at one of the joint parts and which has windows for receiving the balls, wherein the cage is held axially in one direction by a section of a cage guiding surface at a joint part and in the opposite direction by a counterface at a separate termination element which is provided at the joint part, and wherein the cage guiding surface of the joint part is formed undercut-free toward the termination element.

According to another feature of the invention, the one of the joint parts has an inner contour, the inner contour forms the cage guiding surface; and the cage guiding surface forms a counterface, the counterface of the cage guiding surface and the counterface of the termination element are disposed opposite from one another for axially holding the cage.

According to yet another feature of the invention, the one of the joint parts has an inner contour, the inner contour forms the cage guiding surface; a given section of the cage guiding surface forms a counterface for axially supporting the cage; and the counterface of the cage guiding surface for axially supporting the cage has a spherical surface and is provided directly adjacent to the undercut-free region of the cage guiding surface.

According to a further feature of the invention, the counterface of the termination element has a spherical surface.

According to yet a further feature of the invention, the spherical surface of the counterface of the one of the joint parts and the spherical surface of the counterface of the termination element each have a respective center point; the center point of the spherical surface of the counterface of the one of the joint parts coincides with the center point of the spherical surface of the counterface of the termination element when the one of the joint parts and the termination element are in an assembled state; the cage has a spherical surface corresponding to the spherical surface of the counterface of the one of the joint parts and the spherical surface of the counterface of the termination element; and the cage is guided with its spherical surface at the spherical surface of the counterface of the one of the joint parts and at the spherical surface of the counterface of the termination element.

According to another feature of the invention, the joint outer part has an inner wall, the cage guiding surface having the undercut-free region and the counterface adjacent to the undercut-free region are provided at the inner wall of the joint outer part.

According to yet another feature of the invention, the joint outer part is a bell having an open side and a closed side, the closed side of the bell forms a joint bottom; the undercut-free region of the cage guiding surface is disposed at the open side of the bell; and the counterface of the cage guiding surface is adjacent to the undercut-free region of the cage guiding surface in a direction toward the joint bottom.

According to a further feature of the invention, the termination element is a cap; and the cap is attached to the joint outer part on a side thereof opposite the counterface of the cage guiding surface of the joint outer part.

According to yet a further feature of the invention, the cap has a connecting section configured to be connected to a concertina cuff.

According to another feature of the invention, the joint outer part has an outer circumferential wall; and the cap is attached to the outer circumferential wall of the joint outer part.

According to another feature of the invention, the cap is a shaped sheet metal part.

According to yet another feature of the invention, the joint outer part, the joint inner part, the balls, the cage, and the cap together form a joint; and the cap has a circumferential depression configured to partially receive the balls in case of a maximum bending of the joint.

According to a further feature of the invention, the bell forming the joint outer part has a stub shaft configured to be inserted into a wheel hub.

According to yet a further feature of the invention, the joint outer part has a finished forged inner contour except at the ball raceways.

According to another feature of the invention, the ball raceways define a pitch circle diameter, the pitch circle diameter increases in a direction towards a side opposite the termination element.

According to yet another feature of the invention, the ball raceways of the joint outer part and/or the joint inner part taper conically in a direction towards a side opposite the termination element.

According to a further feature of the invention, the ball raceways at the joint outer part and the ball raceways at the joint inner part have respective slightly different raceway skew angles.

According to a further feature of the invention, the termination element has a ring formed of wear resistant material applied at the counterface of the termination element.

According to yet a further feature of the invention, the joint outer part or the joint inner part has at least one projection on a side toward the termination element, the projection secures the cage axially.

According to another feature of the invention, the at least one projection is a deformed section of the joint outer part or the joint inner part, wherein the section has been deformed after mounting the cage.

According to yet another feature of the invention, the at least one projection is a securing element installed at one of the joint outer part and the joint inner part.

According to a further feature of the invention, the joint outer part has an inner contour forming the cage guiding surface; the cage guiding surface has a counterface, the counterface of the cage guiding surface and the counterface of the termination element are disposed opposite from one another for axially holding the cage; a ring projection is formed at the joint outer part between the counterface of the cage guiding surface of the joint outer part and the counterface of the termination element; and the cage has an outer diameter, the ring projection has an inner diameter slightly smaller than the outer diameter of the cage.

With the objects of the invention in view there is also provided, a shaft configuration which includes:

a constant velocity fixed joint having joint parts, balls, a cage and a termination element, the joint parts including a joint outer part and a joint inner part, the joint outer part and the joint inner part having crossed ball raceways, the ball raceways of the joint outer part and the ball raceways of the joint inner part being assigned to one another such that the ball raceways form ball raceway pairs, the balls being disposed in respective ones of the ball raceway pairs, the cage being held in place at one of the joint parts, the cage having windows formed therein for receiving the balls, one of the joint parts having a cage guiding surface with a given section, the cage being held axially in a first direction by the given section of the cage guiding surface, the termination element being provided as a separate element at the one of the joint parts having the cage guiding surface, the termination element having a counterface, the cage being held axially in a second direction opposite the first direction by the counterface of the termination element, the cage guiding surface of the one of the joint parts having an undercut-free region toward the termination element; and a shaft connected to the constant velocity fixed joint, the shaft and the constant velocity fixed joint forming a universal joint shaft.

According to another feature of the invention, the universal joint shaft has a wheel-side and the constant velocity fixed joint is provided on the wheel-side of the universal joint shaft.

According to yet another feature of the invention, the universal joint shaft is a rear axle side shaft.

With the objects of the invention in view there is also provided, a method for producing a constant velocity fixed joint, which includes the steps of:

providing a pre-assembled unit including a first joint part, a cage and a plurality of balls;

bringing together the pre-assembled unit and a second joint part with a purely axial movement;

subsequently attaching a termination element to the second joint part such that the cage is axially held in place when the termination element is in an assembled state.

In other words, according to the invention, there is provided a method for producing a constant velocity fixed joint with crossed ball raceways, in particular a constant velocity fixed joint as defined above, wherein a pre-assembled unit formed of a joint part, a cage and a plurality of balls is brought together with a further joint part by a purely axial movement and subsequently a termination element is attached to the last-mentioned joint part which axially secures the cage in the assembled state.

Another mode of the method according to the invention includes increasing a wear resistance of the termination element at least at a region of the termination element forming a counterface by subjecting the termination element to a hardening process, a nitriding process, or another process for increasing the wear resistance.

Another mode of the method according to the invention includes providing the first joint part as a joint inner part; and providing the second joint part as a joint outer part with a cage guiding surface having an undercut-free region toward the termination element.

Another mode of the method according to the invention includes forming at least one projection by deforming the first joint part or the second joint part on a side toward the termination element for securing the cage axially subsequent to bringing together the pre-assembled unit and the second joint part.

An advantage of the constant velocity fixed joint in accordance with the invention is that by distributing the counterfaces for the cage among two separate components it is possible to provide a simple axial mounting which dispenses with the swiveling motion of the inner parts for mounting and the mounting of the balls by excessively bending the joint.

Rather, it is possible to first bring together a pre-assembled unit, which is formed of a joint part, a cage and a number of balls, and a further joint part by a purely axial movement and subsequently to attach a termination element at the last-mentioned joint part that axially secures the cage in the assembled state.

The ball raceways therefore do not have to be made longer than is necessary for the maximum operating bending angle so that as a result the outlay for the machining is reduced. At the same time it is possible to produce the respective joint part with a short axial component length. This in turn results in a low weight of the component.

In a universal joint shaft with two joints, the shortened length of the component makes it further possible to increase the distance between the center points of the joints. This results in smaller joint bending angles at both joints which in turn results in an improved operating life expectancy, a higher efficiency and if required also increased possible steering angles.

In accordance with an advantageous embodiment of the invention, the inner contour of the one joint part is configured to be undercut-free with the exception of the ball raceways. A section of this inner contour or cage guiding surface serves as a counterface for the cage in a first axial direction while the termination element forms a further counterface in a region of the undercut-free end of the cage guiding surface for axially securing the cage. The constant velocity fixed joint corresponds in principle to a slip joint until the cage is secured by the termination element. It is therefore possible to use components of so-called VL-joints for the constant velocity fixed joint according to the invention and thus it is possible to keep component variety low.

The undercut-free inner contour has preferably a spherical counterface which serves to secure the cage in an axial direction. However, other surface shapes that are non-spherical can be provided for securing the cage axially. In addition, an axial play of the cage of about up to 1 mm can be tolerated.

The counterface at the termination element, which serves for supporting the cage in the opposite direction, can also be shaped such that it is spherical. In the assembled state, the center points of the counterfaces at the termination element and the cage guiding surface of the joint part coincide approximately or exactly depending on the axial play. The cage is guided accordingly with a corresponding spherical surface at the counterfaces in order to ensure the swivel movability of the joint.

In principle it is conceivable to provide a corresponding configuration either at the joint outer part or at the joint inner part. For example, the undercut-free cage guiding surface with a first section and the adjacent counterface can be formed at an inner wall of the joint outer part. However, it is just as well possible to guide the cage in a swiveling manner at the joint inner part and to secure it axially.

According to an advantageous embodiment of the invention, the joint outer part is embodied as a bell which is closed on one side wherein the first section of the cage guiding surface is disposed on the open side and the counterface adjoins in a direction toward the joint bottom. In this embodiment the reduction of the component length is particularly noticeable.

The termination element, which is preferably attached to the joint part after an axial insertion or sliding-on of the cage, can in this case be embodied as a cap which is attached to the joint outer part, specifically on that side which is opposite the counterface. During the assembly, the cage is axially inserted so far until it lies against the for example spherical counterface of the cage guiding surface of the joint outer part. The cage is subsequently axially secured via the cap. In this case, the spherical surface at the counterface can continue the spherical shape of the spherical counterface of the joint outer part at the cap, following the interruption by the first section, provided that the guiding of the cage is substantially without play.

The cap may further have a connection section for a concertina cuff or boot.

The cap is preferably attached at an outer circumferential wall of the joint outer part. The attachment is preferably done in a form-locking manner, however, other techniques of attaching the cap are also possible.

Due to its simple shape it is possible to provide the cap in a particularly cost-effective manner as a sheet metal shaped part.

A circumferential depression in the cap that partially receives the balls at a maximum bending of the joint makes it possible to keep the component length short even with large bending angles.

According to a further advantageous embodiment, the bell of the joint outer part has a shaft stub which serves for insertion into a wheel hub. In this manner extremely light and cost-effective joints can be realized, in particular when the constant velocity fixed joint is used on the wheel-side of a rear axle side shaft.

In order to avoid an increased thrust of the cage against the termination element, it is possible in accordance with a further, preferred embodiment of the invention to provide the pitch circle diameter (PCD) defined by the ball raceways such that it increases in a direction toward a side opposite from the termination element or cap. In this case, the joint inner components have a tendency to run against the preferably hardened counterface in the joint outer part. A premature wear of the termination element or cap as well as an undesired detachment of the termination element on its own is prevented in this manner.

In accordance with an advantageous embodiment, the ball raceways at the joint outer part and/or joint inner part taper conically in a direction toward a side opposite the termination element or cap.

There is further the possibility to achieve a self-centering of the cage toward a middle or central position and thus to relieve the load on the cap by providing slightly different raceway skew angles at the joint outer part and the joint inner part.

According to a further advantageous embodiment it is possible to subject the termination element or cap to a wear-reducing process at least in the region of the counterface. The termination element can in particular be hardened or nitrided entirely or in the region of the counterface. It is further possible to apply a ring formed of a wear-resistant material in the area of the counterface.

The load or strain of the termination element or cap can be reduced by an axial securing of the cage after the assembly. According to a further advantageous embodiment of the invention, the cage is axially secured by at least one projection on the side of the joint outer part or joint inner part pointing toward the termination element or cap. The at least one projection can in this case be a deformed section of the joint outer part or the joint inner part, wherein the section is deformed after the mounting of the cage, or the at least one projection can be an additional securing element mounted at the joint outer part or the joint inner part.

The constant velocity fixed joint according to the invention is suited for universal joint shafts, in particular side shafts of motor vehicles. As mentioned above, the constant velocity fixed joint is preferably provided on the wheel-side of such a universal joint shaft which however does not rule out the use of the joint on the transmission-side.

Other features which are considered as characteristic for the invention are set forth in the appended claims.

Although the invention is illustrated and described herein as embodied in a constant velocity fixed joint having crossed raceways, a universal-joint shaft, and a method for producing a constant velocity fixed joint having crossed raceways, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
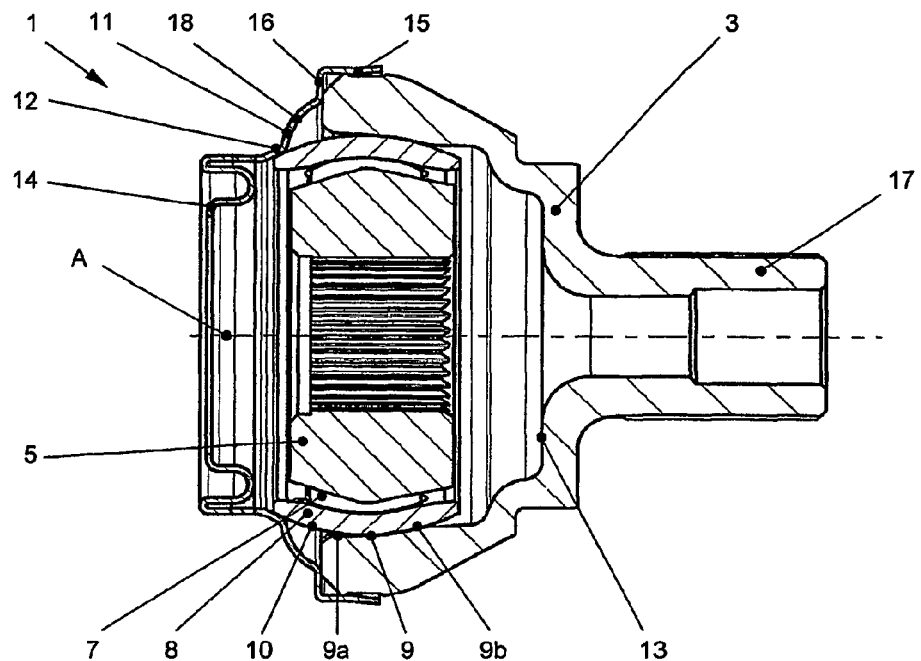
FIG. 1 is a diagrammatic sectional view of a constant velocity fixed joint according to the invention as a wheel-side joint of a rear axle side shaft in a non-angled position.

Referring now to the figures of the drawings in detail and first, particularly, to FIG. 1 thereof, there is shown an exemplary embodiment of a constant velocity fixed joint 1 having crossed raceways of balls, which is shown here in an exemplary manner as a joint of a side shaft wherein the joint is on the wheel-side and wherein the side shaft is in particular a rear axle side shaft 2 of a motor vehicle. In accordance with a modified embodiment, it is also possible to use the joint on the transmission side. The constant velocity fixed joint 1, which is explained in detail below, can however also be utilized for other purposes that are independent of a universal joint shaft.

The constant velocity fixed joint 1 according to the exemplary embodiment includes a joint outer part 3 which has an inner circumferential surface and which has a plurality of ball raceways 4 provided at the inner circumferential surface. The joint outer part 3 receives a joint inner part 5 which is also provided with a plurality of ball raceways 6 at its outer circumferential surface. The ball raceways 4 and 6 on the joint outer part 3 and the joint inner part 5 forms pairs of ball raceways, each pair of raceways receiving a ball 7 in order to support the joint parts 3 and 5 radially against one another. In this case the ball raceways 4 of the joint outer part 3 as well as the ball raceways 6 of the joint inner part 5 are angled towards the respective central axis A of the component. The tilt angles toward the central axis A are of the same magnitude (absolute value of tilt angles) at least for corresponding ball raceways or are of the same magnitude for all ball raceways 4 and, respectively, 6, however the tilt angles for the joint outer part 3 and the joint inner part 5 differ from one another with respect to their sign, such that the raceways 4 and 6 of a pair of raceways always cross one another.

A cage 8 is provided between the joint outer part 3 and the joint inner part 5. The cage 8 is mounted on one of the joint parts, here on the joint outer part 3, such that it can swivel and at the same time is fixed in the axial direction. Bending angles of up to 25 degrees are in this case possible at the joint. The cage 8 has a plurality of windows 8a for accepting the balls 7 such that they are always held in a common plane, namely the half angle plane, when the joint is bent.

The movability with respect to a swivel motion of the cage 8 is ensured via the cage guiding surfaces 9 at the inner circumference of the joint outer part 3. In conventional constant velocity fixed joints, the cage guiding surfaces are configured such that they secure the cage axially in both directions. This however results in a high outlay for mounting the cage because it has to be in a tilted position when it is inserted into the joint outer part. In the exemplary embodiment illustrated here, this problem is avoided by configuring the cage guiding surfaces 9 without an undercut when viewed in the direction of the central axis A of the component.

As a result, the cage 8, which is spherically curved at its outer circumference, is axially inserted into the joint outer part 3. The outer circumference 10 of the cage 8 first glides in this case along a first section 9a, which has no undercut, until it hits a counterface or stop face 9b which can be spherically curved. The diameter of the curvature corresponds in this case preferably substantially to the diameter of curvature of the cage 8. The undercut-free first section 9a has a tangential transition into the counterface 9b. Instead of a curvature it is also possible to provide other surface contours which have no undercut as a counterface 9b, as long as the swivel movability of the cage is not restricted.

The cage 8 can however only be axially secured in one direction in this manner. The axial securing in the opposite direction is done by a separate termination element 11 which is attached to the joint outer part 3 after the cage 8 is mounted. In its assembled state, the cage 8 is consequently held axially in one direction by a segment 9b of a cage guiding surface 9 at a joint outer part 3 and is held in the opposite direction by a stop or counterface 12 at the separate termination element 11 provided at the joint outer part 3.

The stop 12 at the termination element 11 can be formed as a spherical counterface. When the illustrated joint 1 is in its assembled state, the center points of the spherical surfaces at the termination element 11 and at the joint outer part 3 coincide. The cage 8 is guided at these surfaces with a likewise spherical outer circumference 10 or spherical segments at its outer circumference such that it can be swiveled. If the contact surface between the stop 12 and the cage 8 is very small, then it is not absolutely necessary to have a spherical form at the stop 12. It may already be sufficient to position it at an imaginary spherical surface around the center point of the spherical surfaces 9b in order to implement the required axial securing of the cage 8 while ensuring the swiveling mobility.

In accordance with a modification of the illustrated exemplary embodiment, a small axial play or clearance of up to 1 mm is provided. As a result there is a slight offset of the rotation center points of the spherical counterfaces 9b and 12 which are not necessarily spherical.

Figure 2:
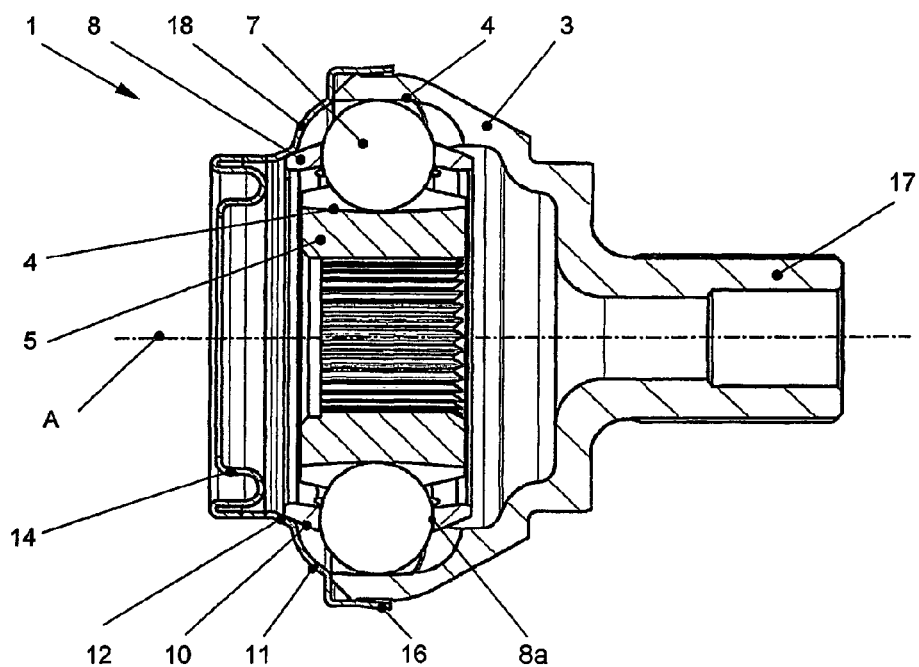
FIG. 2 is a further diagrammatic sectional view of the constant velocity fixed joint according to the invention.
Figure 3:
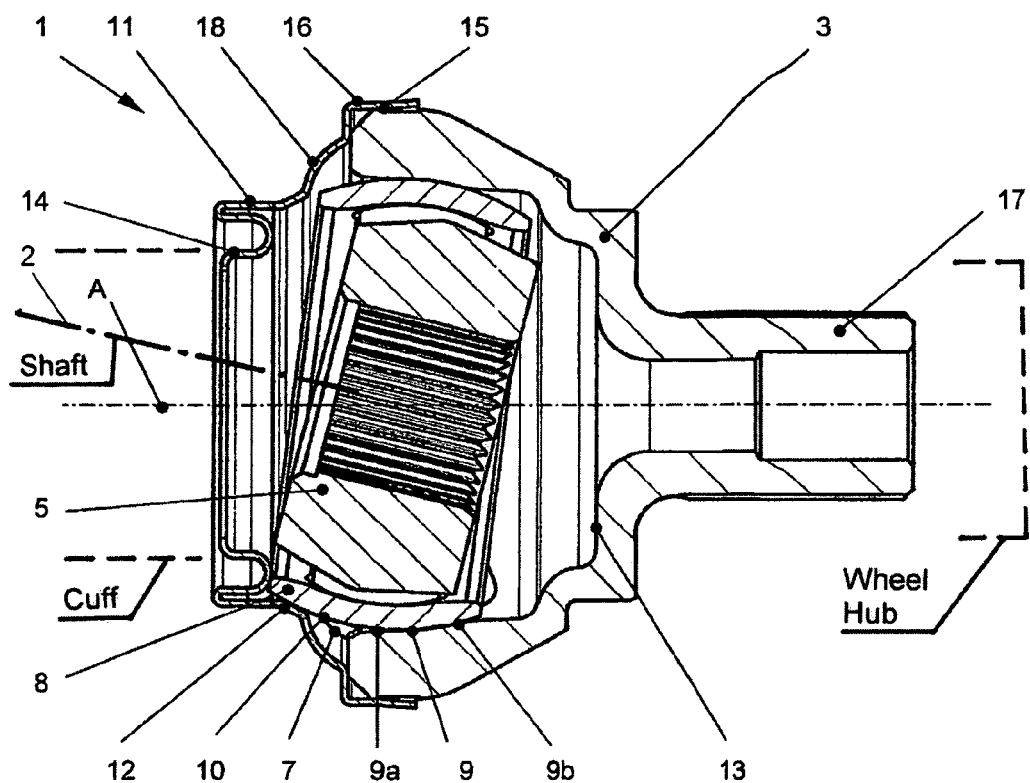
FIG. 3 is a diagrammatic sectional view of the constant velocity fixed joint of FIG. 1 according to the invention in an angled position.

The above-described configuration, which allows an especially small axial component length of the joint outer part 3, is extremely well suited for closed joint outer parts 3, because the axial mounting concept described here has a significant effect on shortening the component length of the joint outer parts. Such a joint outer part 3 is shown in FIGS. 1 to 3. However, the configuration according to the invention can of course also be utilized for disk-shaped joint outer parts which are axially open at both ends. These can be manufactured more effectively in this manner because the forging process of the inner contour can in this case also be finished. In this case also the mounting is easier.

If the joint outer part 3 forms a bell that is closed on one side, then the section 9a of the cage guiding surface 9 that has no undercut is provided on the open side. The spherical section 9b follows in a direction of the joint bottom 13. At the opposite side of the joint bottom 13, a shaft stub 17 can be provided that can be inserted into a wheel hub. The wheel hub is only schematically indicated as a dashed line in FIG. 3. In this manner it is possible to realize an extremely light and cost-effective joint on the wheel-side, in particular for rear axle side shafts. A shaft which is connected to the constant velocity fixed joint is schematically indicated as a dash-dotted line in FIG. 3.

The termination element 11 is preferably configured as a cap which at the same time serves for connecting a concertina cuff. FIGS. 1 and 2 show the associated connecting section 14. A concertina cuff only schematically indicated as a dashed line in FIG. 3.

The termination element 11 or cap is attached on that side of the joint outer part towards which the section 9a that has no undercut ends. The attachment of the cap is preferably provided at an outer circumferential wall of the joint outer part 3. In the exemplary embodiment illustrated here, a projection 15 at a circumferential flange 16 engages in a groove formed at the joint outer part 3 in order to secure the cap in a form-locking manner in the axial direction. However, other possibilities for the attachment are of course also conceivable.

Further, the cap can be produced in a very simple and cost-effective manner as a part formed from sheet metal. When the joint is bent to its maximum extent, the balls 7 are in a space-saving manner accommodated in a circumferential depression 18 provided at the cap.

In order to avoid an excessive wear of the termination element 11 or cap as a result of the cage 8 running against it or striking it, the following measures which are explained in more detail can be used individually or in combination. These measures are based on the idea of either increasing the wear resistance of the affected component parts or avoiding a movement of the joint inner components in a direction towards the cap. In particular the last-mentioned measure avoids a detachment of the cap in case of adverse operating conditions, such as driving through a pothole, by relieving the load or pressure on the cap.

With the help of a variable configuration of the pitch circle diameter (PCD) it is possible to achieve that the cage 8 runs in a targeted manner against the counterface 9b of the cage guiding surface 9, the counterface 9b being provided at the joint outer part 3. Hardening the counterface 9b prevents a premature wear at that location.

For that purpose, the ball raceways 4 and, respectively, 6 are configured such that the pitch circle diameter (PCD) increases in a direction away from the termination element 11 or cap. This can for example be realized by a conical taper of the ball raceways 4 and, respectively, 6 at the joint outer part 3 and/or at the joint inner part 5 in a direction toward the side opposite the cap. The cage 8 has then a tendency to move away from the cap during operation, as a result of which the cap is relieved of stress.

A similar effect can be achieved by slightly different raceway skew angles or lead angles at the joint outer part 3 and at the joint inner part 5. In this case there is no exact point of intersection of the raceway axes when the joint is bent. As a result, only by deforming the joint components, the balls will find a location where they can remain. The associated deformation work increases the further the joint shifts from the central position. As a result, there is a self-centering of the joint because during operation the joint settles at the lowest amount of deformation work. In this manner increased axial forces at the termination element 11 or cap are avoided.

In order to provide a further protection against wear, the termination element or cap can be hardened, nitrided or be subjected to other methods for reducing wear at least in the region of the stop face 12. It is further possible to use a ring made from a wear resistant material in the region of the stop face 12, for example by inserting, bonding, clamping or otherwise placing a ring in the cap.

Finally, it is possible to secure the cage 8 axially after being mounting, in order to prevent a self-acting disassembly of the joint. For that purpose at least one securing projection can be provided on that side of the joint outer part 3 or joint inner part 4 that faces the termination element 11 or cap. This securing projection is for example a section of the joint outer part 3 or the joint inner part 4 that has been deformed subsequent to mounting the cage. For example, it is possible to partially deform the cage guideway in the joint outer part 3 in a direction of the open side by a plastic deformation subsequent to assembling the joint, for example by a swaging process. It is also possible to widen the joint inner part 4, by swaging or a similar process, to such an extent that it is no longer axially movable with respect to the cage 8.

It is also conceivable to provide additional securing elements which are put into the joint and there prevent an axial movement between the cage 8 and the joint outer part 3 or the cage 8 and the joint inner part 4.

Figure 4:
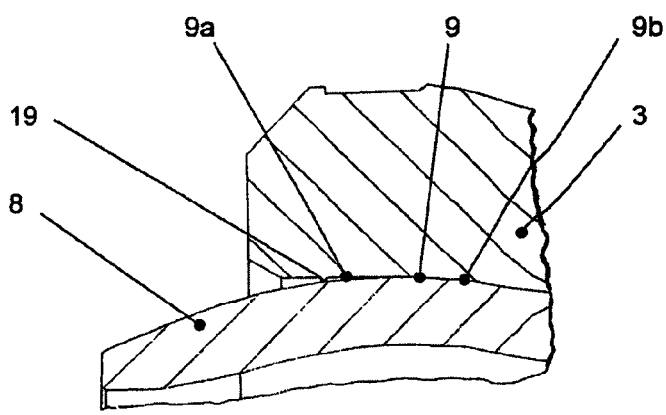
FIG. 4 is a diagrammatic sectional view of a detail of the constant velocity fixed joint according to the invention.

FIG. 4 shows a further possibility of preventing a movement of the joint inner parts in a direction of the termination element or cap. For this purpose, a ring projection 19 is formed at the undercut-free section 9a of the guiding surface 9. The inner diameter of the ring projection 19 is slightly smaller than the outer diameter of the cage 8. When mounting the joint, the cage 8 is pushed past the ring projection 19 into the joint outer part 3 wherein the cage 8 and the joint outer part 3 are only briefly elastically deformed. The ring projection 19 is in this case so positioned that it just does not touch the cage 8 in the installation position. However, if the cage starts to move in a direction toward the termination element 11, then this movement is limited when the cage runs against the projection 19. Furthermore, an excessive bending of the joint can be avoided by the ring projection 19.

Overall, the result is in this case a constant velocity fixed joint 1 with crossed raceways which can be assembled in a very simple manner. In particular, the assembly can be readily automated. During assembly, first the joint inner part 5, the cage 8 and the balls 7 are fitted together into a unit. This unit and the joint outer part 3 are then brought together by a purely axial movement. Subsequently the termination element 11 or cap is attached to the joint outer part 3 in order to secure the cage 8 in the axial direction in this manner. Also, an excessive bending of the joint for the purpose of mounting the balls 7 is omitted.

This results in a particularly compact and lightweight embodiment of a constant velocity fixed joint with crossed raceways. This advantage becomes in particular noticeable in so-called monoblock embodiments which have a joint outer part that is closed on one side.

Figure 5:
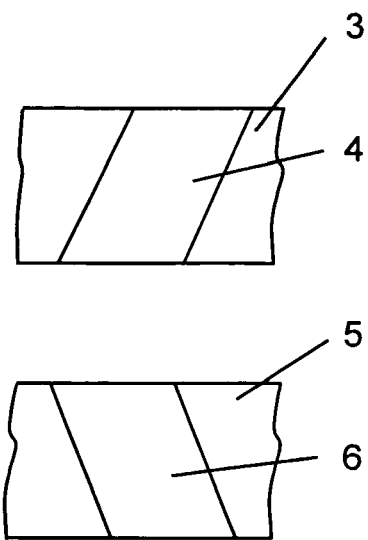
FIG. 5 is a partial schematic view of a joint outer part and a joint inner part having crossed ball raceways in accordance with the invention.
Figure 6:
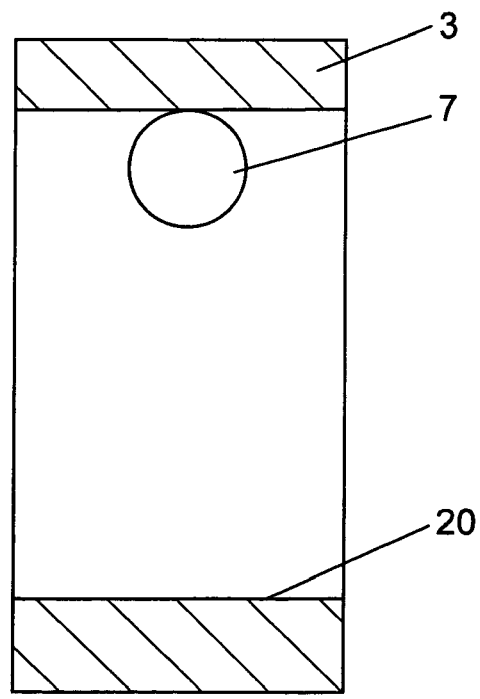
FIG. 6 is a diagrammatic sectional view of a disk-shaped joint outer part axially open at both ends and having a finished forged inner contour except at its ball raceways in accordance with the invention.
Figure 7:
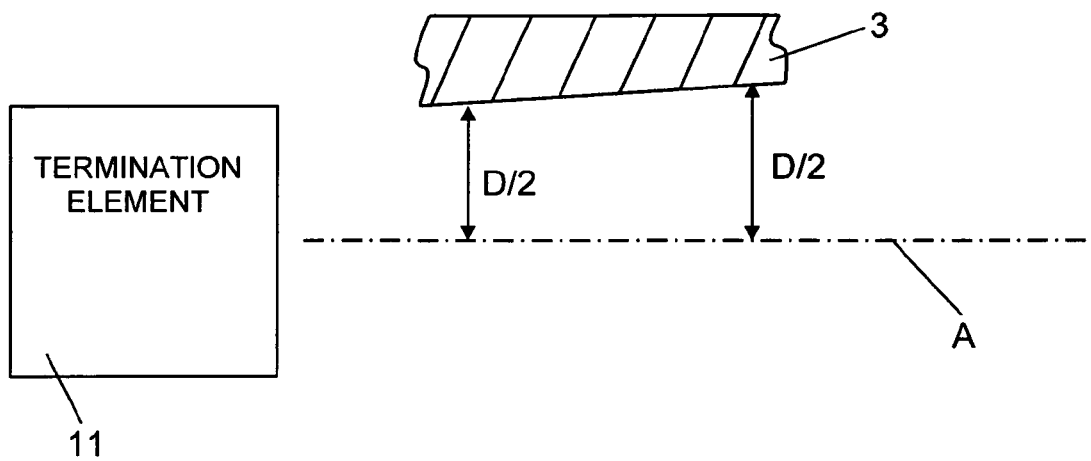
FIG. 7 is a schematic illustration of a pitch circle diameter that increases in a direction away from a termination element in accordance with the invention.
Figure 8:
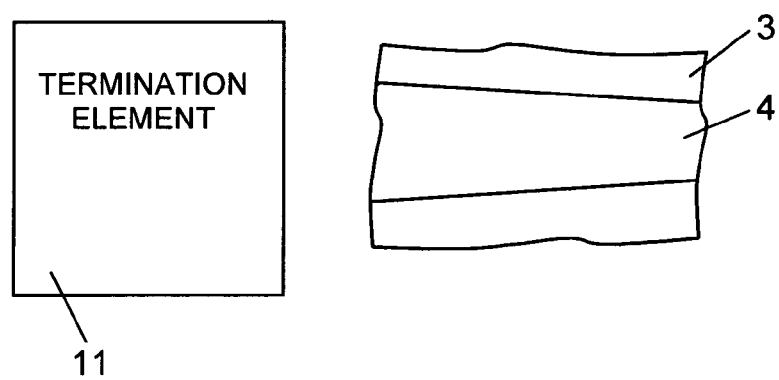
FIG. 8 is a partial diagrammatic view of a ball raceway that conically tapers in a direction away from a termination element in accordance with the invention.
Figure 9:
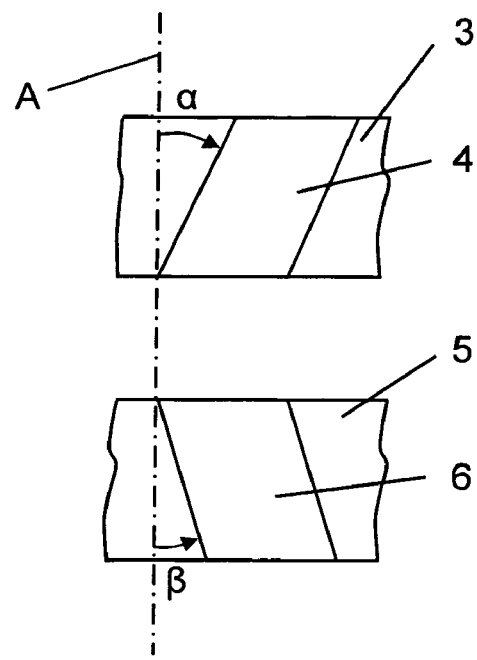
FIG. 9 is a partial diagrammatic view of joint outer and inner parts having respective different raceway skew angles in accordance with the invention.
Figure 10:
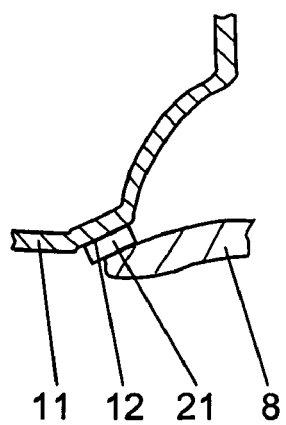
FIG. 10 is a partial diagrammatic sectional view of a ring formed of wear resistant material and applied at a counterface of a termination element in accordance with the invention.
Figure 11:
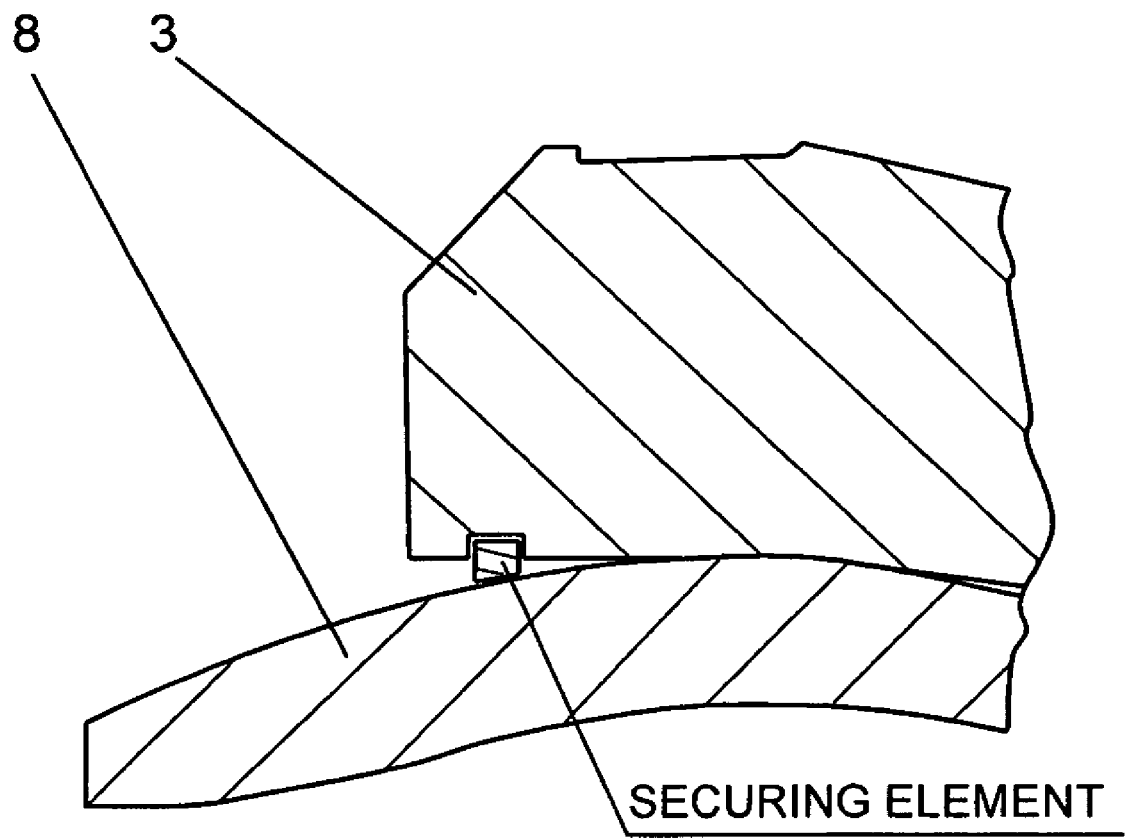
FIG. 11 is a partial diagrammatic sectional view of a securing element installed at the joint outer part for securing the cage axially in accordance with the invention.

FIG. 5 is a partial schematic view of a joint outer part 3 and a joint inner part 5 having crossed ball raceways 4, 6 in accordance with the invention. FIG. 6 is a diagrammatic sectional view of a disk-shaped joint outer part 3 axially open at both ends and having a finished forged inner contour 20 except at its ball raceways in accordance with the invention. FIG. 7 is a schematic illustration of a pitch circle diameter D of a ball raceway of a joint outer part 3 that increases in a direction away from the termination element 11 in accordance with the invention. FIG. 8 is a partial diagrammatic view of a ball raceway 4 of a joint outer part 3 that conically tapers in a direction away from the termination element 11 in accordance with the invention. FIG. 9 is a partial diagrammatic view of joint outer and inner parts 3, 5 having respective different raceway skew angles α, β in accordance with the invention. FIG. 10 is a partial diagrammatic view of a ring 21 formed of wear resistant material and applied at the counterface 12 of the termination element 11 in accordance with the invention. FIG. 11 is a partial sectional view of a securing element installed at the joint outer part 3 for securing the cage 8 axially in accordance with the invention.

LIST OF REFERENCE NUMERALS

1 constant velocity fixed joint
2 universal joint shaft
3 joint outer part
4 ball raceway
5 joint inner part
6 ball raceway
7 ball
8 cage
8a window
9 cage guiding surface
9a first undercut-free section of the cage guiding surface 9
10 spherical outer circumferential surface of the cage 8
11 termination element (cap)
12 stop or counterface of the termination element 11
13 joint bottom
14 connecting section
15 projection
20 inner contour of joint outer part
21 ring
16 flange
D pitch circle diameter
α,β raceway skew angles
17 shaft stub
18 circumferential depression
19 ring projection
A central axis of the component

We claim:

1. A constant velocity fixed joint comprising:
joint parts including a joint outer part and a joint inner part;
said joint outer part and said joint inner part having crossed ball raceways, said ball raceways of said joint outer part and said ball raceways of said joint inner part being assigned to one another such that said ball raceways form ball raceway pairs;
balls disposed in respective ones of said ball raceway pairs;
a cage held in place at one of said joint parts, said cage having windows formed therein for receiving said balls;
one of said joint parts having a cage guiding surface with a given section, said cage being held axially in a first direction by said given section of said cage guiding surface;
a termination element provided as a separate element at said one of said joint parts, said termination element having a counterface, said cage being held axially in a second direction opposite the first direction by said counterface of said termination element;

said cage guiding surface of said one of said joint parts having an undercut-free region toward said termination element; and said ball raceways defining a pitch circle diameter, said pitch circle diameter increasing in a direction towards a side opposite said termination element, and said cage having a tendency to move away from said termination element during operation.

2. The constant velocity fixed joint according to claim 1, wherein:

said one of said joint parts has an inner contour, said inner contour forms said cage guiding surface; and said cage guiding surface forms a counterface, said counterface of said cage guiding surface and said counterface of said termination element are disposed opposite from one another for axially holding said cage.

3. The constant velocity fixed joint according to claim 2, wherein:

said termination element is a cap; and said cap is attached to said joint outer part on a side thereof opposite said counterface of said cage guiding surface of said joint outer part.

4. The constant velocity fixed joint according to claim 3, wherein said cap has a connecting section configured to be connected to a concertina cuff.

5. The constant velocity fixed joint according to claim 3, wherein:

said joint outer part has an outer circumferential wall; and said cap is attached to said outer circumferential wall of said joint outer part.

6. The constant velocity fixed joint according to claim 3, wherein said cap is a shaped sheet metal part.

7. The constant velocity fixed joint according to claim 3, wherein:

said joint outer part, said joint inner part, said balls, said cage, and said cap together form a joint; and said cap has a circumferential depression configured to partially receive said balls in case of a maximum bending of said joint.

8. The constant velocity fixed joint according to claim 1, wherein:

said one of said joint parts has an inner contour, said inner contour forms said cage guiding surface;

a given section of said cage guiding surface forms a counterface for axially supporting said cage; and said counterface of said cage guiding surface for axially supporting said cage has a spherical surface and is provided directly adjacent to said undercut-free region of said cage guiding surface.

9. The constant velocity fixed joint according to claim 8, wherein said counterface of said termination element has a spherical surface.

10. The constant velocity fixed joint according to claim 9, wherein:

said spherical surface of said counterface of said one of said joint parts and said spherical surface of said counterface of said termination element each have a respective center point;

said center point of said spherical surface of said counterface of said one of said joint parts coincides with said center point of said spherical surface of said counterface of said termination element when said one of said joint parts and said termination element are in an assembled state;

said cage has a spherical surface corresponding to said spherical surface of said counterface of said one of said joint parts and said spherical surface of said counterface of said termination element; and said cage is guided with its spherical surface at said spherical surface of said counterface of said one of said joint parts and at said spherical surface of said counterface of said termination element.

11. The constant velocity fixed joint according to claim 8, wherein said joint outer part has an inner wall, said cage guiding surface having said undercut-free region and said counterface adjacent to said undercut-free region are provided at said inner wall of said joint outer part.

12. The constant velocity fixed joint according to claim 8, wherein:

said joint outer part is a bell having an open side and a closed side, said closed side of said bell forms a joint bottom;

said undercut-free region of said cage guiding surface is disposed at said open side of said bell; and said counterface of said cage guiding surface is adjacent to said undercut-free region of said cage guiding surface in a direction toward said joint bottom.

13. The constant velocity fixed joint according to claim 12, wherein said bell forming said joint outer part has a stub shaft configured to be inserted into a wheel hub.

14. The constant velocity fixed joint according to claim 1, wherein said joint outer part has a finished forged inner contour except at said ball raceways.

15. A shaft configuration, comprising:

a constant velocity fixed joint having joint parts, balls, a cage and a termination element, said joint parts including a joint outer part and a joint inner part, said joint outer part and said joint inner part having crossed ball raceways, said ball raceways of said joint outer part and said ball raceways of said joint inner part being assigned to one another such that said ball raceways form ball raceway pairs, said balls being disposed in respective ones of said ball raceway pairs, said cage being held in place at one of said joint parts, said cage having windows formed therein for receiving said balls, one of said joint parts having a cage guiding surface with a given section, said cage being held axially in a first direction by said given section of said cage guiding surface, said termination element being provided as a separate element at said one of said joint parts having said cage guiding surface, said termination element having a counterface, said cage being held axially in a second direction opposite the first direction by said counterface of said termination element, said cage guiding surface of said one of said joint parts having an undercut-free region toward said termination element, one of said joint outer part and said joint inner part having at least one projection on a side toward said termination element, said projection securing said cage axially; and a shaft connected to said constant velocity fixed joint, said shaft and said constant velocity fixed joint forming a universal joint shaft.

16. The shaft configuration according to claim 15, wherein said universal joint shaft has a wheel-side and said constant velocity fixed joint is provided on said wheel-side of said universal joint shaft.

17. The shaft configuration according to claim 15, wherein said universal joint shaft is a rear axle side shaft.

18. A constant velocity fixed joint comprising:

joint parts including a joint outer part and a joint inner part;

said joint outer part and said joint inner part having crossed ball raceways, said ball raceways of said joint outer part and said ball raceways of said joint inner part being assigned to one another such that said ball raceways form ball raceway pairs;

balls disposed in respective ones of said ball raceway pairs;

a cage held in place at one of said joint parts, said cage having windows formed therein for receiving said balls;

one of said joint parts having a cage guiding surface with a given section, said cage being held axially in a first direction by said given section of said cage guiding surface;

a termination element provided as a separate element at said one of said joint parts, said termination element having a counterface, said cage being held axially in a second direction opposite the first direction by said counterface of said termination element;

said cage guiding surface of said one of said joint parts having an undercut-free region toward said termination element; and said ball raceways of at least one of said joint outer part and said joint inner part tapering conically in a direction towards a side opposite said termination element, and said cage having a tendency to move away from said termination element during operation.

19. A constant velocity fixed joint comprising:

joint parts including a joint outer part and a joint inner part;

said joint outer part and said joint inner part having crossed ball raceways, said ball raceways of said joint outer part and said ball raceways of said joint inner part being assigned to one another such that said ball raceways form ball raceway pairs;

balls disposed in respective ones of said ball raceway pairs;

a cage held in place at one of said joint parts, said cage having windows formed therein for receiving said balls;

one of said joint parts having a cage guiding surface with a given section, said cage being held axially in a first direction by said given section of said cage guiding surface;

a termination element provided as a separate element at said one of said joint parts, said termination element having a counterface, said cage being held axially in a second direction opposite the first direction by said counterface of said termination element;

said cage guiding surface of said one of said joint parts having an undercut-free region toward said termination element; and said ball raceways at said joint outer part and said ball raceways at said joint inner part having respective different raceway skew angles.

20. A constant velocity fixed joint comprising:

joint parts including a joint outer part and a joint inner part;

said joint outer part and said joint inner part having crossed ball raceways, said ball raceways of said joint outer part and said ball raceways of said joint inner part being assigned to one another such that said ball raceways form ball raceway pairs;

balls disposed in respective ones of said ball raceway pairs;

a cage held in place at one of said joint parts, said cage having windows formed therein for receiving said balls;

one of said joint parts having a cage guiding surface with a given section, said cage being held axially in a first direction by said given section of said cage guiding surface;

a termination element provided as a separate element at said one of said joint parts, said termination element having a counterface, said cage being held axially in a second direction opposite the first direction by said counterface of said termination element;

said cage guiding surface of said one of said joint parts having an undercut-free region toward said termination element; and said termination element having a ring formed of wear resistant material applied at said counterface of said termination element.

21. A constant velocity fixed joint comprising:

joint parts including a joint outer part and a joint inner part;

said joint outer part and said joint inner part having crossed ball raceways, said ball raceways of said joint outer part and said ball raceways of said joint inner part being assigned to one another such that said ball raceways form ball raceway pairs;

balls disposed in respective ones of said ball raceway pairs;

a cage held in place at one of said joint parts, said cage having windows formed therein for receiving said balls;

one of said joint parts having a cage guiding surface with a given section, said cage being held axially in a first direction by said given section of said cage guiding surface;

a termination element provided as a separate element at said one of said joint parts, said termination element having a counterface, said cage being held axially in a second direction opposite the first direction by said counterface of said termination element;

said cage guiding surface of said one of said joint parts having an undercut-free region toward said termination element; and one of said joint outer part and said joint inner part having at least one projection on a side toward said termination element, said at least one projection being a deformed section of one of said joint outer part and said joint inner part and securing said cage axially.

22. A constant velocity fixed joint comprising:

joint parts including a joint outer part and a joint inner part;

said joint outer part and said joint inner part having crossed ball raceways, said ball raceways of said joint outer part and said ball raceways of said joint inner part being assigned to one another such that said ball raceways form ball raceway pairs;

balls disposed in respective ones of said ball raceway pairs;

a cage held in place at one of said joint parts, said cage having windows formed therein for receiving said balls;

one of said joint parts having a cage guiding surface with a given section, said cage being held axially in a first direction by said given section of said cage guiding surface;

a termination element provided as a separate element at said one of said joint parts, said termination element having a counterface, said cage being held axially in a second direction opposite the first direction by said counterface of said termination element;

said cage guiding surface of said one of said joint parts having an undercut-free region toward said termination element; and one of said joint outer part and said joint inner part having at least one projection on a side toward said termination element, said at least one projection being a securing element installed at one of said joint outer part and said joint inner part and securing said cage axially.

23. A constant velocity fixed joint comprising:

joint parts including a joint outer part and a joint inner part;

said joint outer part and said joint inner part having crossed ball raceways, said ball raceways of said joint outer part and said ball raceways of said joint inner part being assigned to one another such that said ball raceways form ball raceway pairs;

balls disposed in respective ones of said ball raceway pairs;

a cage held in place at one of said joint parts, said cage having windows formed therein for receiving said balls;

one of said joint parts having a cage guiding surface with a given section, said cage being held axially in a first direction by said given section of said cage guiding surface;

a termination element provided as a separate element at said one of said joint parts, said termination element having a counterface, said cage being held axially in a second direction opposite the first direction by said counterface of said termination element;

said cage guiding surface of said one of said joint parts having an undercut-free region toward said termination element;

said joint outer part having an inner contour forming said cage guiding surface;

said cage guiding surface having a counterface, said counterface of said cage guiding surface and said counterface of said termination element being disposed opposite from one another for axially holding said cage;

a ring projection being formed at said joint outer part between said counterface of said cage guiding surface of said joint outer part and said counterface of said termination element; and said cage having an outer diameter, said ring projection having an inner diameter smaller than said outer diameter of said cage.

\* \* \* \* \*